United States Patent
Wu et al.

(10) Patent No.: US 6,680,925 B2
(45) Date of Patent: Jan. 20, 2004

(54) METHOD AND SYSTEM FOR SELECTING A BEST SERVING SECTOR IN A CDMA DATA COMMUNICATION SYSTEM

(75) Inventors: Qiang Wu, San Diego, CA (US); Nagabhushana Sindhushayana, San Diego, CA (US); Peter J. Black, San Diego, CA (US); Rajiv Vijayan, San Diego, CA (US); Rashid Attar, San Diego, CA (US)

(73) Assignee: Qualcomm Incorporated, San Deigo, CA (US)

( * ) Notice: Subject to any disclaimer, the term of this patent is extended or adjusted under 35 U.S.C. 154(b) by 186 days.

(21) Appl. No.: 09/982,239

(22) Filed: Oct. 16, 2001

(65) Prior Publication Data

US 2003/0072278 A1 Apr. 17, 2003

(51) Int. Cl.$^7$ .................................................. H04Q 7/00
(52) U.S. Cl. ........................ 370/329; 370/331; 370/332
(58) Field of Search ............................. 370/331, 332, 370/329, 333, 328, 431; 375/136, 147, 150, 349, 347

(56) References Cited

U.S. PATENT DOCUMENTS

| | | | |
|---|---|---|---|
| 4,901,307 A | 2/1990 | Gilhousen et al. | |
| 5,101,501 A | * 3/1992 | Gilhousen et al. | 455/442 |
| 5,103,459 A | 4/1992 | Gilhousen et al. | |
| 5,267,261 A | * 11/1993 | Blakeney et al. | 370/332 |
| 5,625,876 A | * 4/1997 | Gilhousen et al. | 370/331 |
| 6,157,668 A | 12/2000 | Gilhousen et al. | |
| 2001/0015998 A1 | * 8/2001 | Lomp et al. | 375/147 |
| 2002/0027890 A1 | * 3/2002 | Bernstein et al. | 370/331 |

FOREIGN PATENT DOCUMENTS

WO    0176306 A1    10/2001

* cited by examiner

Primary Examiner—Wellington Chin
Assistant Examiner—Ray Jain
(74) Attorney, Agent, or Firm—Phillip Wadsworth; Kent Baker

(57) ABSTRACT

In a disclosed embodiment, signal levels of the active sectors of an access terminal are compared with the signal level of the current serving sector of the access terminal. Next, a delta credit is accumulated. If a DRC lock bit is available, then an accumulated total credit is authorized to produce an authorized accumulated total credit. Afterwards, a new serving sector is identified from a pool of candidate sectors based on the signal levels of the active sectors and the authorized accumulated total credits.

26 Claims, 8 Drawing Sheets

METHOD AND SYSTEM FOR SELECTING A BEST SERVING SECTOR IN A CDMA DATA COMMUNICATION SYSTEM

BACKGROUND

1. Field

The present invention generally relates to wireless communication systems and more particularly to a method and system for site selection transmit diversity (SSTD) in a CDMA data communication system.

2. Related Art

The current generation of cellular phone systems offers more services than those of previous generations, such as data services. First and second generation cellular communication systems were typically used mostly for voice services. Second generation systems began adding limited data services, albeit at low data rates. Third generation systems, such as the Code Division Multiple Access ("CDMA") High Data Rate ("HDR") system, offer integrated data capabilities with much higher data rates than that of second generation systems, which are capable of offering services such as streamed audio and video.

A cellular network consists of many geographic cells, each of which may contain multiple sectors. Inside each cell, there is a base station. A user typically communicates with the network through the sector that provides the best signal. When a mobile user changes location, the user may communicate with the network through a different sector that provides the most reliable signal. Techniques for hand off in second generation CDMA communication system are known in the art. However, CDMA data communication systems, such as CDMA HDR, present new problems when a mobile unit selects a new sector.

One such problem occurs when a user switches among sectors too quickly. In a conventional CDMA cellular system, data traffic, which includes voice, is routed to each sector that is actively communicating with a mobile unit, possibly using multiple base stations. Consequently, all active sectors in communication with a mobile unit send traffic to the mobile unit. The redundancy in traffic was needed to meet the low-delay requirements of voice data for handoff. This constraint is relaxed in a data network.

In a packet data network, users may tolerate short delays in the data transmission. Since low delay is no longer a constraint on the system, reliability can be more efficiently achieved through re-transmission rather than redundant transmission through all the active sectors all the time in handoff scenario. Thus, in a conventional high rate packet data cellular system, data traffic is typically routed through one sector that maximizes the forward link throughput. To accomplish this routing, the mobile monitors all the active sectors, among which the user selects the best and informs the network of its selection. Such a system exploits the channel dynamics in order to maximize the capacity. The selection of the transmitter to exploit local peaks in the shadowing process is a form of selection diversity. Thus, the selection of the best serving sector is also referred to as site selection transmit diversity ("SSTD").

FIG. 1 illustrates a typical CDMA data communication system, such as CDMA HDR. Access network 100 contains several access points, of which only access points 110 and 130 are shown. A mobile unit, such as access terminal 114, communicates with an access point, such as access point 110, to connect to access network 100. In general, an access point, such as access point 110, will have several sectors, such as sectors 116, 118, and 120.

Since access terminal 114 generally communicates with one sector at a time, data going to access terminal 114 from access point 110 must be routed to the specific sector with which access terminal 114 is communicating.

However, a problem emerges when an access terminal is constantly switching among sectors. Suppose sector 116 has the strongest forward link signal at one instance such that access terminal 114 selects sector 116 as the current serving sector. In a next instance, sector 132 of access point 130 has the strongest forward link signal. Just moments later, sector 116 again has the strongest forward link. It is possible that rapid switching between the two or more sectors can occur. Each time a switch occurs, data that was going to be sent to access terminal 114, must be sent to the corresponding data queue for that sector. Further, the user cannot receive data before the data queue is ready. Such rapid transitions can create a significant amount of overhead for the network, and outage for the user.

A second problem for selecting the best sector is related with the reverse link reliability. On the reverse link, access terminal 114 may send channel state feedback information to the network to assist the network in achieving the highest forward link throughput. In the high data network system, access terminal 114 transmits a data rate control signal ("DRC") to control the data rate on the forward link. Access terminal 114 also sends an acknowledge signal ("ACK") to the serving sector when it successfully receives a packet. Access terminal 114 should select a new sector that has a reliable reverse link connection with access terminal 114. Otherwise, DRC and ACK information can be lost, which reduces the throughput of the system. However, access terminal 114 does not readily know the reliability of a reverse link connection. If access terminal 114 selects a sector with an unreliable reverse link, throughput can suffer due to retransmission.

Ideally, access terminal 114 should select a new sector so that its throughput on the forward link is maximized. Firstly, the site selection should avoid fast toggling. Secondly, the site selection should incorporate the impact of the reverse link reliability on forward link throughput. Thus, there is a need in the art for methods and systems for properly selecting the best serving sector in a CDMA data communication system.

SUMMARY

Embodiments disclosed herein address the above stated needs by using signal level and timing hysteresis and using a DRC reverse link reliability information in site selection transmit diversity in a CDMA data communication system.

The presently disclosed embodiments are directed to method and system for site selection transmit diversity in a CDMA data communication system. According to one aspect of the present invention, signal levels of the active sectors of an access terminal are compared with the signal level of the current serving sector of the access terminal. Next, using a signal level hysteresis, a delta credit is accumulated. When the reverse link reliability information is available, an accumulated total credit is authorized to produce an authorized accumulated total credit. Afterwards, the best serving sector is identified from a pool of candidate sectors based on the signal levels of the active sectors and the authorized accumulated total credits.

DETAILED DESCRIPTION

The presently disclosed embodiments are directed to method and system for selecting the best serving sector to achieve site selection transmit diversity in a CDMA data communication system. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. The word "exemplary" is used exclusively herein to mean "serving as an example, instance, or illustration." Any embodiment described herein as "exemplary" is not necessarily to be construed as preferred or advantageous over other embodiments.

Figure 1:
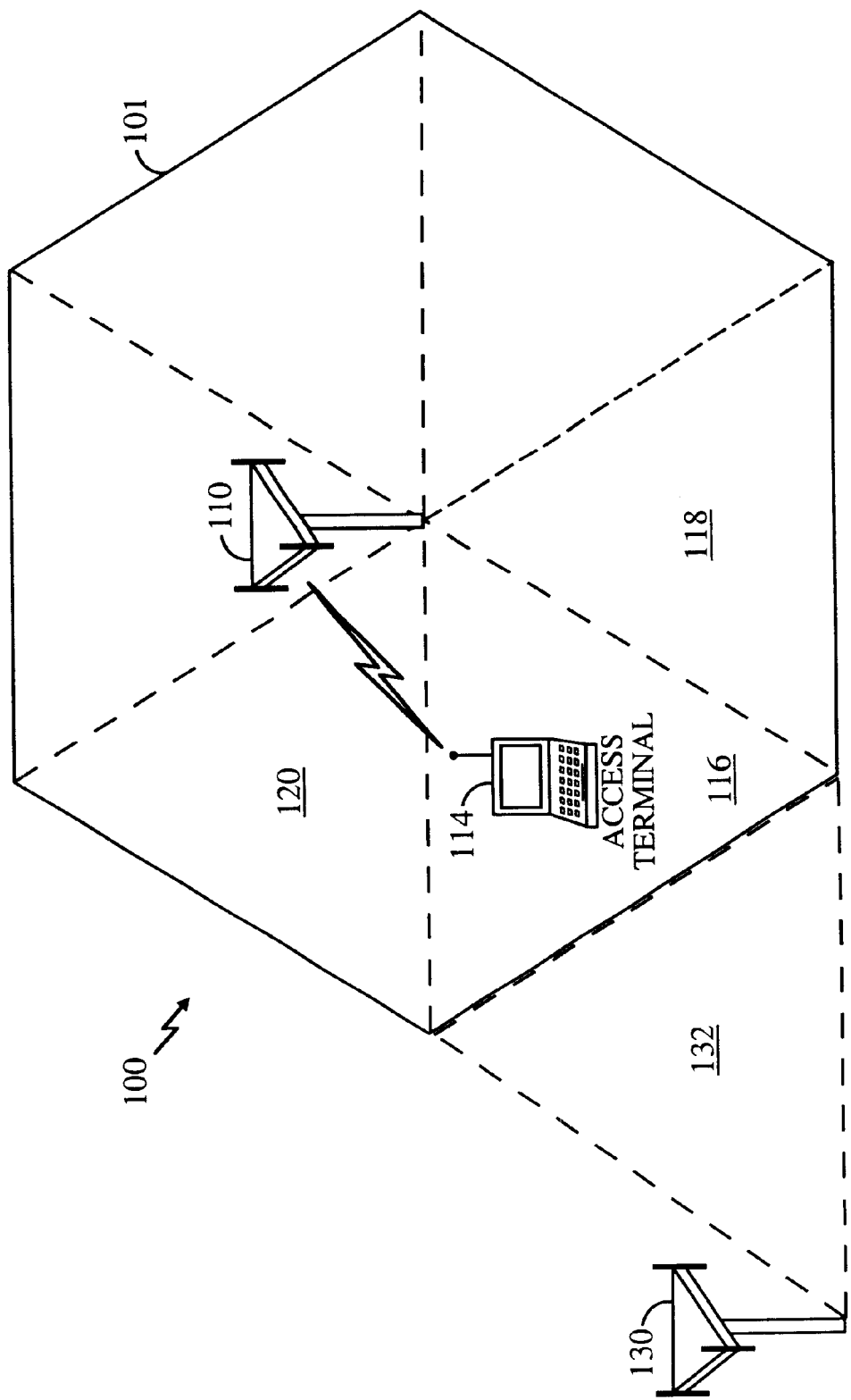
FIG. 1 illustrates an exemplary CDMA data communication system access network comprising an access terminal an access points.
Figure 2:
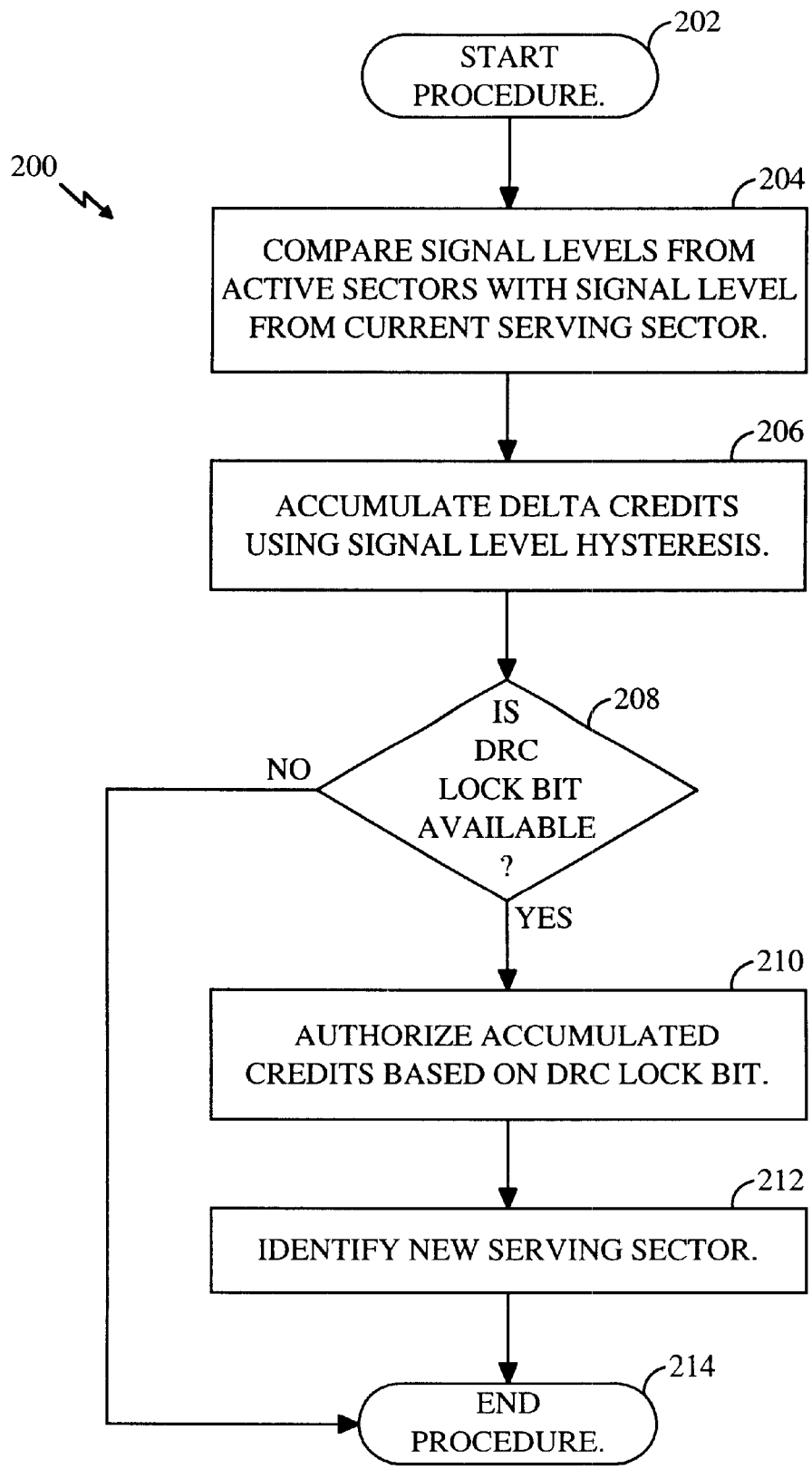
FIG. 2 illustrates an exemplary procedure for selecting a best serving sector.

FIG. 2 illustrates one embodiment of the invention. By way of example, the present embodiment of the invention operates in a CDMA communication system. The general principles of CDMA communication systems, and in particular the general principles for generation of spread spectrum signals for transmission over a communication channel is described in U.S. Pat. No. 4,901,307 entitled "Spread Spectrum Multiple Access Communication System Using Satellite or Terrestrial Repeaters" and assigned to the assignee of the present invention. The disclosure in that patent, i.e. U.S. Pat. No. 4,901,307, is hereby fully incorporated by reference into the present application. Moreover, U.S. Pat. No. 5,103,459 entitled "System and Method for Generating Signal Waveforms in a CDMA Cellular Telephone System" and assigned to the assignee of the present invention, discloses principles related to PN spreading, Walsh covering, and techniques to generate CDMA spread spectrum communication signals. The disclosure in that patent, i.e. U.S. Pat. No. 5,103,459, is also hereby fully incorporated by reference into the present application. Further, the present invention utilizes time multiplexing of data and various principles related to "high data rate" communication systems, and the present invention can be used in a "high data rate" communication systems, disclosed in U.S. patent application entitled "Method and Apparatus for High Rate Packet Data Transmission" Ser. No. 08/963,386 filed on Nov. 3, 1997, and assigned to the assignee of the present invention. The disclosure in that patent application is also hereby fully incorporated by reference into the present application.

Procedure 200 may operate in software at access terminal 114 and/or access point 110 for example. Procedure 200 contains steps for determining the best serving sector to achieve site selection transmit diversity for access terminal 114. When operating in a CDMA HDR system, procedure 200 is called once each HDR slot while access terminal 114 is in the connected state, i.e. communicating with access network 100. The procedure begins in step 202 and proceeds to the next step. In step 204, access terminal 114 measures the forward link signal level from each sector in the active set of pilots of access terminal 114, also referred to as the active sectors. Also, in step 204, the forward link signal level for the current serving sector is measured.

In CDMA data communication systems, such as CDMA HDR, an access terminal can receive traffic on the forward link transmission using either variable rate or fixed rate mode. Normally, when a reverse link transmission is reliable, it is preferable for access terminal 114 to receive data transmitted from the access terminal using variable data rates. Otherwise, when a reverse link transmission is not reliable, i.e. when DRC channel is not reliable for the sector with the strongest forward link signal, a fixed data rate mode may be used. In fixed rate mode, access terminal 114 receives traffic at a low, but steady, data rate to use for a plurality of slots. In one embodiment, the invention determines the signal levels for both variable rate mode and fixed rate mode. In a later step, either variable rate mode or fixed rate mode can be selected when a sector is chosen. Step 204 is presented in more detail in FIG. 3.

In step 206, access terminal 114 determines the difference between the forward link signal levels from the active sectors and the forward link signal levels from the current serving sector and then accumulates the differences for each slot to generate an accumulated total credit. Step 206 is presented in more detail in FIG. 4.

In step 208, procedure 200 determines whether a new set of DRC lock bits has been received. If a new set of DRC lock bits has been received, then the procedure continues to step 210. Otherwise, the procedure continues to the end of the procedure at step 214.

In step 210, procedure 200 authorizes the accumulated total credits based on the DRC lock bits of the current serving sector and the active sectors. Since the DRC lock bits reveal whether the reverse link of the sectors are reliable, the DRC lock bits are utilized to generally authorize the credits of the sectors having a reliable reverse link and to discard the credits of the sectors having an unreliable reverse link. After step 210, the procedure continues to step 212. Step 210 is presented in more detail in FIG. 5.

In step 212, procedure 200 uses the authorized accumulated total credits from step 210 to identify the best serving sector. Step 212 is presented in more detail in FIG. 6.

Figure 3:
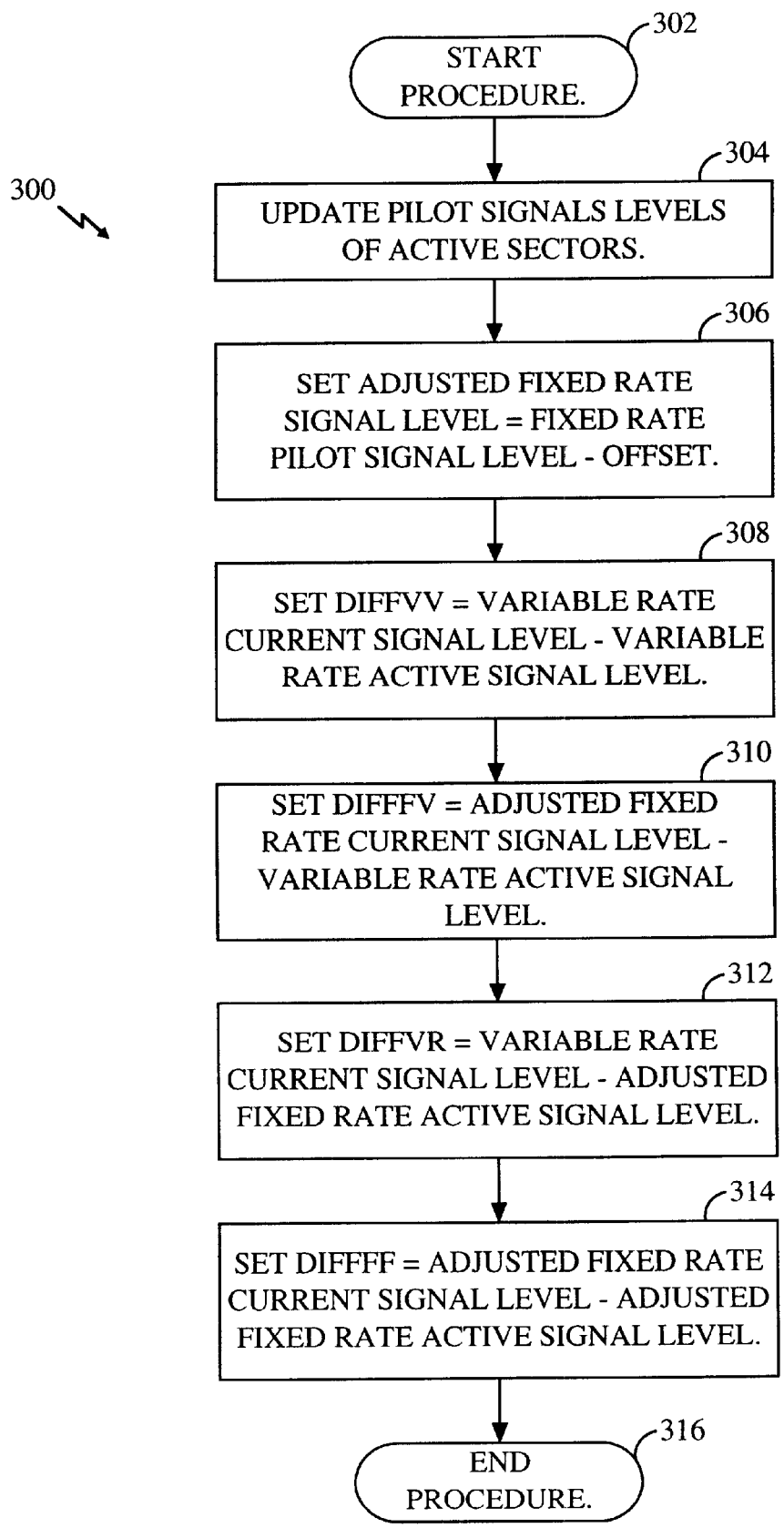
FIG. 3 illustrates an exemplary procedure for comparing signal levels of an active sector with the current serving sector.

Procedure 300 of FIG. 3 expands on the signal level estimate step of procedure 200, namely step 204. Procedure 300 is called once per slot and is used to estimate the signal levels of the active sectors. Procedure 300 begins in step 302. In step 304, the procedure updates the pilot signal level estimates of the active sectors. Procedure 300 then determines a variable rate signal level and a fixed rate signal level. The variable rate signal level and fixed rate signal level are calculated for each active sector. Both the variable rate and fixed rate signal level estimates may be determined by a single pole infinite impulse response ("IIR") filter.

As mentioned previously, the actual rate of data transmission in fixed rate state, also referred to as the "adjusted fixed rate signal level," is generally set to be lower than the rate of transmission indicated by the fixed rate signal level determined in step 304. To set the adjusted fixed rate signal level to below the fixed rate signal level, an offset amount of energy in decibels (dB) is deducted from the fixed rate signal level in step 306. In one embodiment, the offset amount of energy is 6 dB. This adjustment to the fixed rate signal level, i.e. the determination of an adjusted fixed rate signal level, is performed for all active sectors.

After step 306, procedure 300 begins a series of comparisons between the signal level of the current serving sector with that of all other active sectors. In each comparison, the variable rate and adjusted fixed rate signal levels of the current serving sector are compared with the variable rate and adjusted fixed rate signal levels of an active sector.

In step 308, the procedure takes the difference between the variable rate signal level of the current serving sector and the variable rate signal level of an active sector. The difference is set to a difference, DiffVV. A separate DiffVV is stored for each comparison with a different active sector. The procedure continues at step 310.

In step 310, the procedure takes the difference between the adjusted fixed rate signal level of the current serving sector and the variable rate signal level of an active sector. The difference is set to a difference, DiffFV. A separate DiffFV is stored for each comparison with a different active sector. The procedure continues at step 312.

In step 312, the procedure takes the difference between the variable rate signal level of the current serving sector and the adjusted fixed rate signal level of an active sector. The difference is set to a difference, DiffVF. A separate DiffVF is stored for each comparison with a different active sector. The procedure continues at step 314.

In step 314, the procedure takes the difference between the adjusted fixed rate signal level of the current serving sector and the adjusted fixed rate signal level of an active sector. The difference is set to a difference, DiffFF. A separate DiffFF is stored for each comparison with a different active sector. The procedure ends at the end of procedure, step 316.

It is thus appreciated that each DiffXX value, i.e. DiffFF, DiffFV, DiffVF and DiffVV, determined in procedure 300 reflects the difference in signal level between the current serving sector and an active sector. As an example, DiffFV reflects the signal level difference between the current serving sector in fixed mode and an active sector in variable mode.

Figure 4:
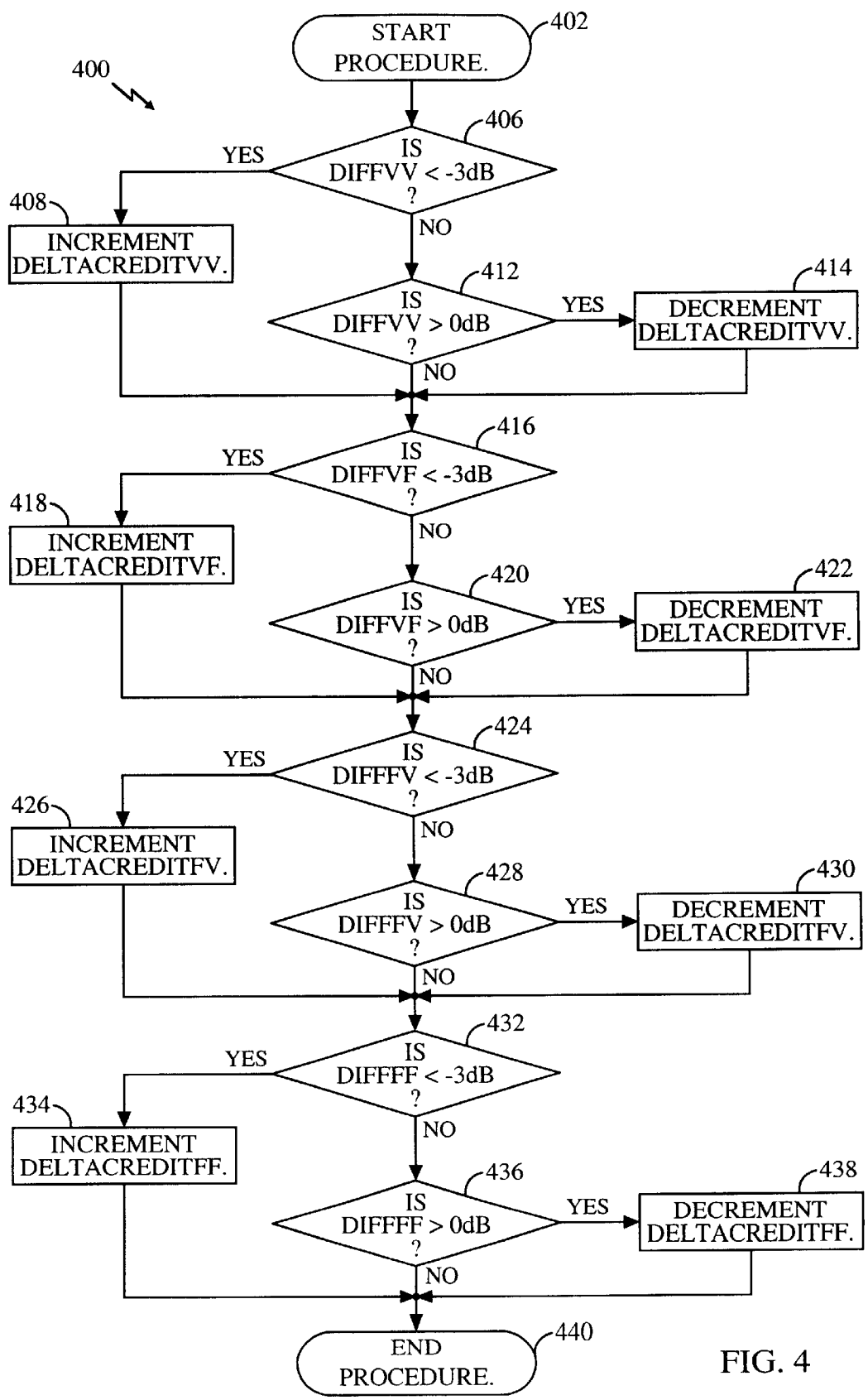
FIG. 4 illustrates an exemplary procedure for accumulating delta credits using a signal level hysteresis.

Exemplary procedure 400 of FIG. 4 expands on the credit accumulation step of procedure 200, namely step 206. Procedure 400, is performed once every slot. Procedure 400 accumulates the differences determined in FIG. 3 according to a signal level hysteresis. In applying the signal level hysteresis to the differences, each difference, DiffVV, DiffFV, DiffVF, and DiffFF, is compared to two thresholds. For example, in the present embodiment, if a difference is between less than −3 dB, a corresponding delta credit is incremented or "accumulated," and if the difference is greater than 0 dB the corresponding delta credit is decremented. A signal level hysteresis ensures that only active sectors with sufficiently strong signal levels are identified for the purpose of selecting a best serving sector.

Procedure 400 begins in step 402. In step 406, procedure 400 determines if DiffVV is less than −3 dB. If DiffVV is less than −3 dB, then procedure 400 continues to step 408. Otherwise, procedure 400 continues to step 412. In step 408, procedure 400 increments DeltaCreditVV by one and continues to step 416.

In step 412, procedure 400 determines if DiffVV is greater than 0 dB. If DiffVV is greater than 0 dB, then procedure 400 continues to step 414. Otherwise, procedure 400 continues to step 416. In step 414, procedure 400 decrements DeltaCreditVV by one and continues to step 416.

In step 416, procedure 400 determines if DiffVF is less than −3 dB. If DiffVF is less than −3 dB, then procedure 400 continues to step 418. Otherwise, procedure 400 continues to step 420. In step 418, procedure 400 increments DeltaCreditVF by one and continues to step 424.

In step 420, procedure 400 determines if DiffVF is greater than 0 dB. If DiffVF is greater than 0 dB, then procedure 400 continues to step 422. Otherwise, procedure 400 continues to step 424. In step 422, procedure 400 decrements DeltaCreditVF by one and continues to step 424.

In step 424, procedure 400 determines if DiffFV is less than −3 dB. If DiffFV is less than −3 dB, then procedure 400 continues to step 426. Otherwise, procedure 400 continues to step 428. In step 426, procedure 400 increments DeltaCreditFV by one and continues to step 432.

In step 428, procedure 400 determines if DiffFV is greater than 0 dB. If DiffFV is greater than 0 dB, then procedure 400 continues to step 430. Otherwise, procedure 400 continues to step 432. In step 430, procedure 400 decrements DeltaCreditFV by one and continues to step 432.

In step 432, procedure 400 determines if DiffFF is less than −3 dB. If DiffFF is less than −3 dB, then procedure 400 continues to step 434. Otherwise, procedure 400 continues to step 436. In step 434, procedure 400 increments DeltaCreditFF by one and continues to step 440.

In step 436, procedure 400 determines if DiffFF is greater than 0 dB. If DiffFF is greater than 0 dB, then procedure 400 continues to step 438. Otherwise, procedure 400 continues to step 440. In step 438, procedure 400 decrements DeltaCreditFF by one and continues to step 440. In step 440, procedure 400 ends.

Figure 5:
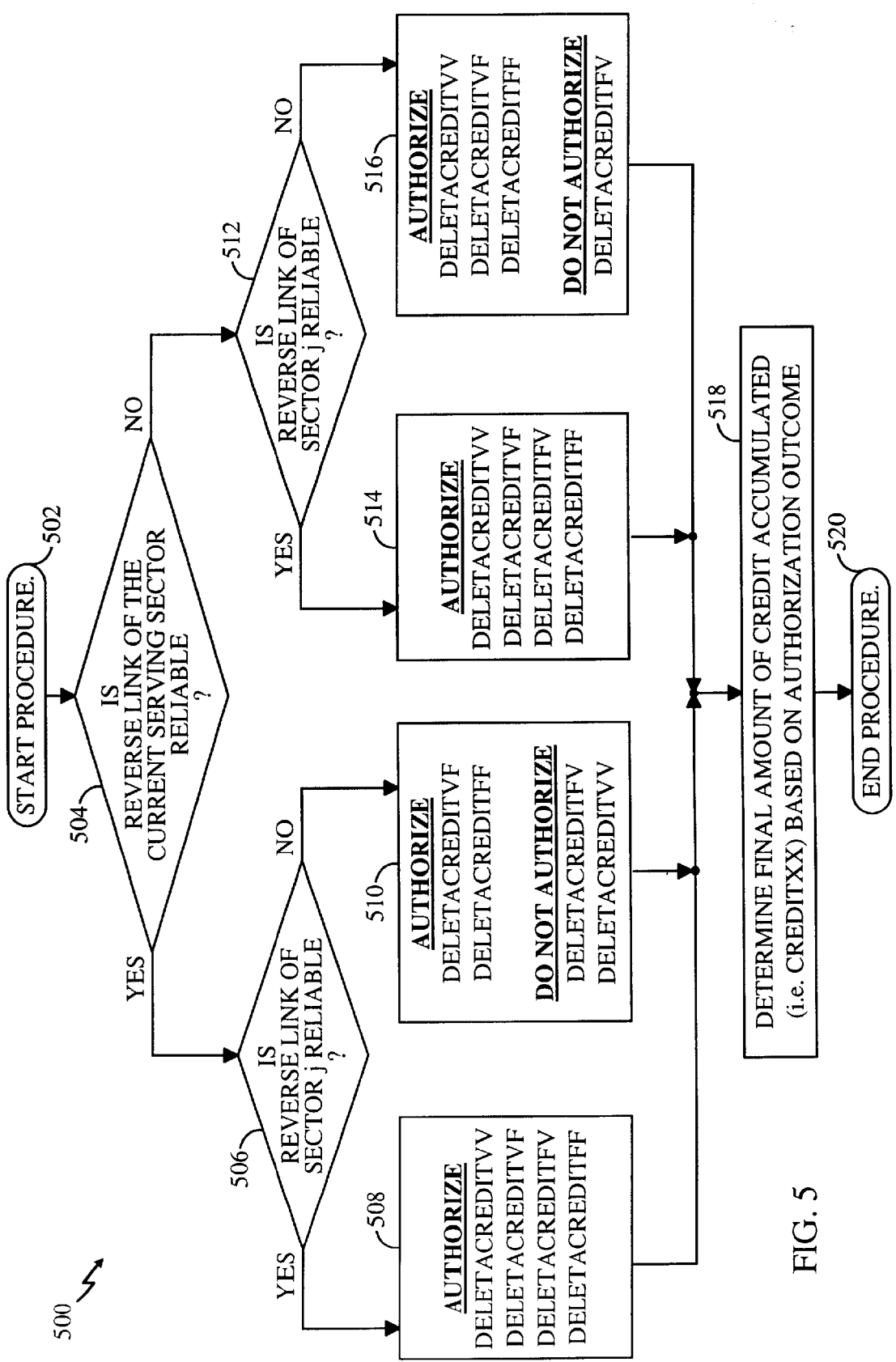
FIG. 5 illustrates an exemplary procedure for credit authorization.

Exemplary procedure 500 of FIG. 5 expands on the authorization step of procedure 200, namely step 210. Procedure 500 is performed after the delta credits have been accumulated over L slots, where in one embodiment L is set to 64. Procedure 500 authorizes the accumulated total credits, i.e. DeltaCreditVV, DeltaCreditVF, DeltaCreditFV, and DeltaCreditFF, obtained in procedure 400. Procedure 500 authorizes the delta credits for each sector based on the received reliability information for the reverse links of all the active sectors. Authorizing delta credit can be implemented by adding or subtracting an appropriate amount to the accumulated total credits.

Procedure 500 begins in step 502. In step 504, procedure 500 determines if the reverse link of the current serving sector is reliable. The reverse link of the current serving sector is reliable if the DRC lock bit for the current serving sector is '1.' If the DRC lock bit of the current serving sector is '1,' then procedure 500 continues to step 506. Otherwise, procedure 500 continues to step 512.

In step 506, procedure 500 determines if the reverse link of a sector j is reliable, i.e. whether the DRC lock bit of sector j is '1.' If the DRC lock bit of sector j is '1,' then procedure 500 continues to step 508. Otherwise, procedure 500 continues to step 510. In step 508, since sector j has been found to have a reliable reverse link, all the Delta Credits accumulated for sector j are authorized. In other words, all the Delta Credits that were accumulated previously in procedure 400 for sector j based on the assumption that sector j has a reliable reverse link can now be accepted (i.e. authorized) because the DRC lock bit for sector j in fact validates the assumption. Thus, at step 508, DeltaCreditVV, DeltaCreditVF, DeltaCreditFV and DeltaCreditFF for sector j are all authorized.

If it is instead determined at step 506 that the reverse link for sector j is unreliable, i.e. that the DRC lock bit for sector j is '0,' then procedure 500 proceeds to step 510. In step 510, only DeltaCreditVF and DeltaCreditFF are authorized, while DeltaCreditFV and DeltaCreditVV are rejected, i.e. they are not authorized.

If it is determined in step 504 that the reverse link of the current serving sector is not reliable, procedure 500 continues at step 512. In step 512, procedure 500 determines if the reverse link of the active sector j is reliable, i.e. DRC lock bit of sector j is '1.' If the DRC lock bit of sector j is '1,' then procedure 500 continues to step 514. Otherwise, procedure 500 continues to step 516. In step 514, since the current serving sector has an unreliable reverse link and sector j has a reliable reverse link, the credits accumulated for sector j are authorized. All the credits, i.e. DeltaCreditVV, DeltaCreditVF, DeltaCreditFV and DeltaCreditFF, can be authorized because the DRC lock bit validates the assumption that sector j has a reliable reverse link.

In step 516, since the reverse link for the current serving sector and sector j are both unreliable, only DeltaCreditVV, DeltaCreditVF and DeltaCreditFF are authorized. All the DeltaCreditFV for sector j are rejected.

Once the authorization or rejection of delta credits has been completed in steps 508, 510, 514 or 516, procedure 500 continues to step 518. In step 518, the credits authorized for sector j in the preceding step, i.e. either step 508, 510, 514 or 516, are tabulated to generate CreditFF, CreditFV, CreditVF and CreditVV for sector j. It is noted that any of CreditFF, CreditFV, CreditVF or CreditVV tabulated in step 518 is represented generally by CreditXX. Procedure 500 for the authorization of the accumulated delta credits then ends at step 520.

Figure 6:
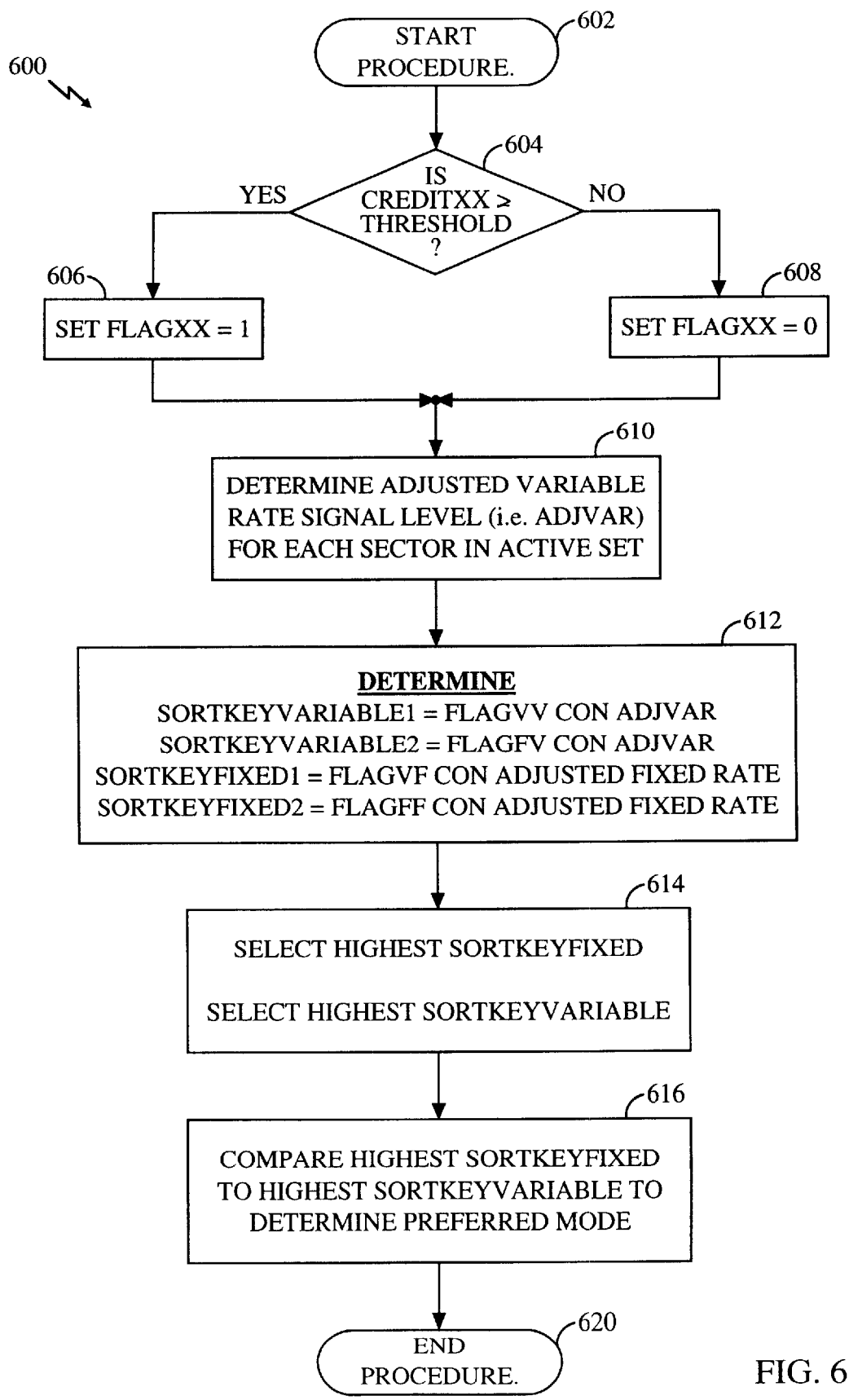
FIG. 6 illustrates an exemplary procedure for identifying a best serving sector.

The exemplary procedure of FIG. 6 expands of the identification step of procedure 200, namely step 212. Procedure 600 selects the best serving sector based on the authorized accumulated total credits from step 210, which was explained in FIG. 5 above.

Procedure 600 begins at step 602. In step 604, the credits, i.e. CreditXX, accumulated and authorized for a candidate sector, i.e. a sector j of the active set, are compared to a threshold. The threshold can be, for example, set at 64. If CreditXX for the candidate sector is above the threshold, procedure 600 continues to step 606 where value FlagXX is set to '1'. Otherwise, procedure 600 continues to step 608 where value FlagXX is set to '0'. Thus, value FlagXX indicates whether the tabulated credits for a candidate sector when compared to the current serving sector are sufficiently high to support a switch from the current serving sector to the candidate factor. As an example, if FlagFV for a candidate sector exceeds the threshold, it can be interpreted to mean that the candidate sector in variable mode would be a better selection than the current serving sector in fixed mode. On the other hand, if FlagFV does not exceed the threshold, it can be interpreted to mean that the better choice would be the current serving sector in fixed mode, rather than the candidate sector in variable mode. Steps 604, 606, and 608 are repeated for all candidate sectors and for each variation of CreditXX, i.e. CreditFF, CreditFV, CreditVF and CreditVV, to generate a set of FlagFF, FlagFV, FlagVF and FlagVV for each candidate sector. Procedure 600 then continues at step 610.

In step 610, the average variable rate signal for each of the candidate sectors is adjusted based on the received DRC lock bits. As has been discussed, the DRC lock bits indicate the reliability and quality of the reverse link; however they are not transmitted continually by the candidate sectors in the active set. Rather, the DRC lock bits are transmitted only intermittently, e.g. every 64 slots. Once they are received, the DRC lock bits can be utilized to determine the actual signal level for a candidate sector in variable mode. The adjusted variable rate signal level ("AdjVAR") can be determined by deducting a value based on the DRC lock bits from the average variable rate determined previously under the assumption that the reverse link was reliable. Step 610 is performed once for each sector in the active sector set. In other words, an adjusted variable rate signal level, AdjVAR, is determined for each candidate sector.

Once the four FlagXX values and the AdjVAR have been determined for each candidate sector in the steps described above, procedure 600 continues in step 612. In step 612, FlagVV and AdjVAR for a candidate sector are concatenated to generate a single integer, SortKeyVariable1. For example, if FlagVV for the candidate sector is 'x' and the AdjVAR for the candidate sector is 'y,' then SortKeyVariable1 for the candidate sector would be 'xy.' Using the same method, SortKeyVariable2 is determined by concatenating FlagFV and AdjVar, SortKeyFixed1 is determined by concatenating FlagVF and the adjusted fixed rate for the candidate sector and SortkeyFixed2 is determined by concatenating FlagFF and the adjusted fixed rate for the candidate sector. Thus, for each candidate sector in the active set, step 612 generates four SortKey values, namely SortKeyVariable1, SortKeyVariable2, SortKeyFixed1 and SortKeyFixed2.

The four SortKey values for the candidate sectors determined in step 612 represent the relative improvement to be expected if a switch is made from the current serving sector to one candidate sector versus another candidate sector. For example, if the SortKeyVariable1 for a first candidate sector is greater than the SortKeyVariable1 for a second sector, it can be concluded that, with the current serving sector in variable mode, a switch to the first candidate sector in variable mode would be a better switch than a switch to the second candidate sector in variable mode. As another example, if the SortKeyFixed2 for a first candidate sector is less than the SortKeyFixed2 for a second candidate sector, then it can be concluded that, with the current serving sector in fixed mode, the better selection would be to switch to the second candidate sector in fixed mode than to switch to the first candidate sector in fixed mode.

Following the determination of the four SortKey values for each of the candidate sectors in step 612, procedure 600 continues to step 614. In step 614, the highest SortKey value for a switch to variable mode and the highest SortKey value for a switch to fixed mode are identified. The highest SortKey value indicates the switch for both variable and fixed mode which will provide the best transmission quality and rate. Thus, in order to identify the highest SortKey value for a switch to variable mode, the SortKeyVariable1 and SortKeyVariable2 values of all candidate sectors are compared against each other. The SortKeyVariable1 or SortKeyVariable2 having the highest value overall is identified as the HighestSortKeyVariable. Similarly, the SortKeyFixed1 and SortKeyFixed2 values of all the candidate sectors are compared to identify the HighestSortKeyFixed.

Procedure 600 then continues to step 616 where the HighestSortKeyVariable is compared to the HighestSortKeyFixed. Whichever value is higher is selected as the preferred mode, i.e. the best serving sector. For example, if HighestSortKeyVariable is higher than HighestSortKeyFixed, then the preferred mode would be variable mode and the best serving sector would be the sector having the HighestSortKeyVariable. Procedure 600 then ends in step 620.

In an alternative embodiment, the procedure of FIG. 2 can determine reverse link reliability without the use of DRC lock bits. Exemplary procedure 700 illustrated in FIG. 7 uses reverse link power control bits ("RPC") to determine the reliability of the reverse link in lieu of DRC lock bits. Procedure 700 comprises several procedures that are found in procedure 200. Procedure 700 begins in step 702. Step 704, is identical to step 204 of procedure 200. It will be recalled that the details of step 204 were presented in procedure 300. Thus, procedure 300 details the operation of step 704 as well.

In step 706, procedure 700 filters RPC bits of an active sector to determine a corresponding reverse link reliability. RPC bits may be filtered using a single pole IIR to determine a mean value or average value. If the average value of the RPC bits for the sector exceeds a threshold value, then it can be concluded that the sector has a reliable reverse link. Otherwise, the sector has an unreliable reverse link.

RPC bits are generally transmitted continuously by the active sectors, as opposed to being transmitted once per L slots in the case of DRC lock bits. Since, the reverse link reliability can be determined from the RPC bits, procedure 700 does not need to wait L slots to authorize the accumulated delta credits. Instead, procedure 700 can select a new best serving sector when an accumulated delta credit exceeds a signal level threshold as well as a duration threshold.

Also in step 706, procedure 700 applies a deduction to variable rate and fixed rate mode signal levels for each active sector. A deduction is applied to variable rate signal level if the average or mean RPC value is below a threshold. Otherwise, no deduction is applied. An exemplary deduction for variable rate signal level can be 20 dB. A deduction is applied to fixed rate signal level as well to ensure a lower rate for fixed rate transmission mode. An exemplary deduction for fixed rate signal level can be 6 dB.

Next, step 708 of procedure 700 is similar to step 206 of procedure 200. Step 708 accumulates delta credits as per procedure 400 to produce an accumulated total credits. The accumulated total credits of step 708 do not need to be authorized, since credit authorizing and referencing were included in step 706. In step 710, procedure 700 identifies a new best serving sector as per procedure 600, wherein procedure 700 substitutes accumulated total credits for the authorized accumulated total credits of procedure 600. After step 710, procedure 700 ends at step 712.

Figure 8A:
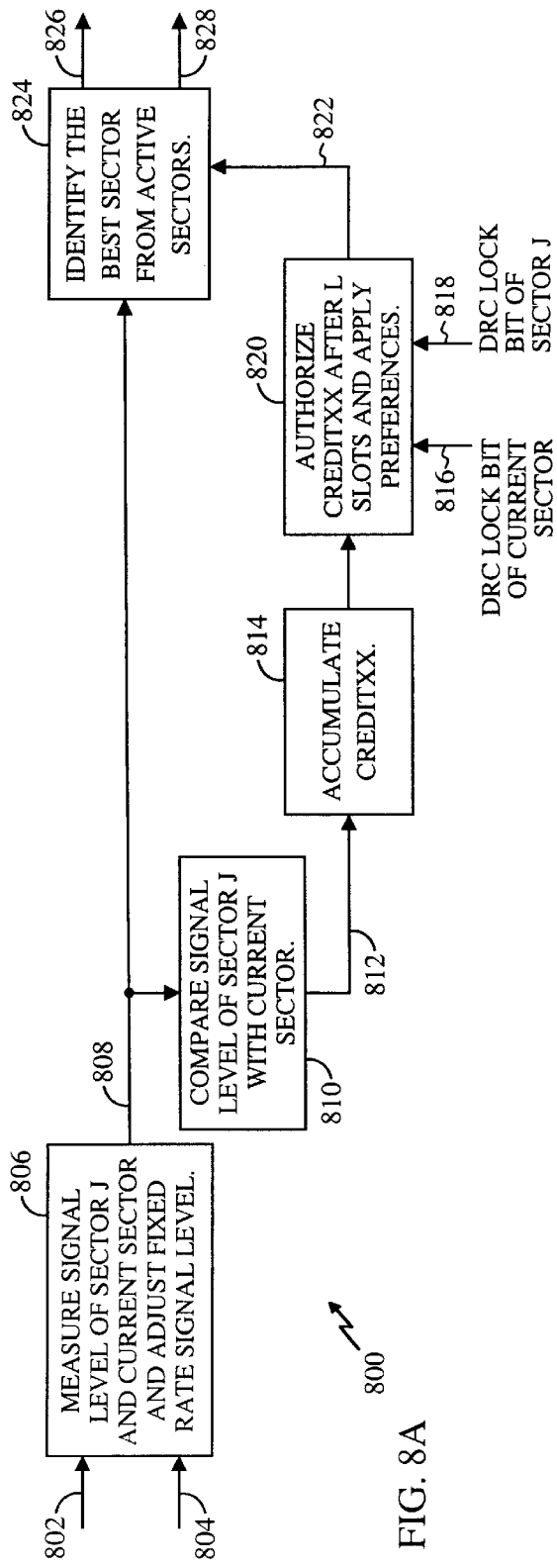
FIG. 8 illustrates exemplary systems for selecting a best serving sector.

System 800 of FIG. 8a depicts exemplary procedure 200 in a system block diagram. Sector j signal level 802 and current serving sector signal level 804 provide input to signal level estimator 806. Signal level estimator 806 deducts an offset value from the fixed rate signal level of the current serving sector and the sectors in the active set to generate adjusted fixed rate signal levels for all sectors. Following, estimator 806 provides the signal level it measures, i.e. signal levels 808, to signal level comparator 810. Comparator 810 determines differences 812, DiffVV, DiffFV, DiffVF, and DiffFF as per procedure 300. Differences 812 are provided as input to accumulator 814. Accumulator 814 applies a hysteresis during accumulation as per procedure 400. Accumulator 814 provides accumulated total credits DeltaCreditVV, DeltaCreditVF, DeltaCreditFV, and DeltaCreditVV to credit authorization module 820. Current serving sector DRC lock bit 816 and sector j DRC lock bit 818 also provide input to credit authorization module 820. After applying preferences and authorization to the accumulated total credits as per procedure 500, credit authorization module 820 provides authorized accumulated total credits 822 to new sector identification module 824. New sector identifier module 824 selects the highest level among a pool of candidate sectors as per operation of procedure 600. The pool of candidate sectors are formed from the active sectors and ordered according to procedures 500 and 600. New sector identifier 824 outputs new serving sector 826 and transmission mode 828. Transmission mode 828 identifies the new serving sector transmission mode as fixed rate or variable rate.

Figure 8B:
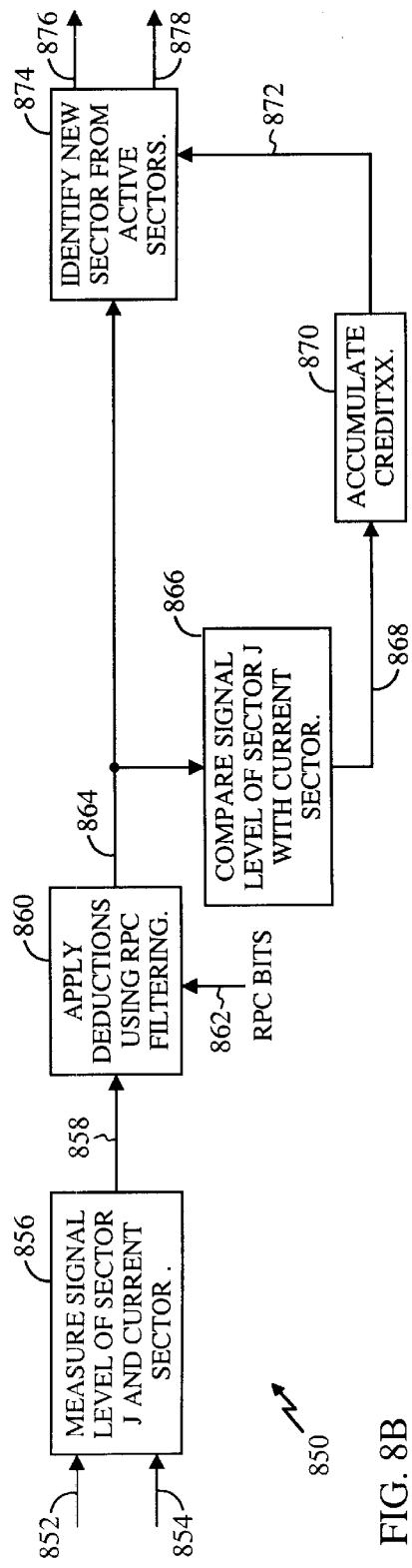

System 850 of FIG. 8b depicts procedure 700 in a system block diagram. Sector j signal level 852 and current serving sector signal level 854 provide input to signal level estimator 856. Signal level estimates 858 and RPC bits of active sectors 862 provide input to RPC filter 860. If the mean RPC exceeds a threshold, then a deduction is applied to the variable rate signal level as per step 706 of procedure 700. Otherwise, no deduction is applied. RPC filter 860 supplies adjusted signal levels 864 to comparator 866 and new sector identifier module 874. Comparator 866 determines differences 868, DiffVV, DiffFV, DiffVF, and DiffFF as per procedure 300. Differences 868 are provided as input to accumulator 870. Accumulator 870 applies a hysteresis during accumulation as per procedure 400. Accumulator 870 provides accumulated total credits 872, DeltaCreditVV, DeltaCreditVF, DeltaCreditFV, and DeltaCreditVV to new sector identification module 874. New sector identifier module 874 selects the sector with highest soft key among a pool of candidate sectors as per operation of procedure 600. Best sector identifier 874 provides outputs best serving sector 876 and transmission mode 878. Transmission mode 878 identifies the new serving sector transmission mode as fixed rate or variable rate.

The above procedures and system block diagrams overcome the problems discussed. The above procedures and system block diagrams obtain the estimation of reverse link reliability from the reception of the DRC Lock bits. In an alternative embodiment, the above procedures and system block diagrams may use a mean or average RPC value to estimate the reverse link reliability. In addition, by using a signal level hysteresis and timing hysteresis, the procedures and system block diagrams overcome the problem of fast toggling. Thus, in the manner described above, the invention provides method and system for selecting a the best serving sector to achieve site selection transmit diversity in a CDMA data communication system. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. The software module, also called a computer program in the present application, may contain a number of source code or object code segments and may reside in any computer readable medium such as a RAM memory, flash memory, ROM memory, EPROM memory, EEPROM memory, registers, hard disk, a removable disk, a CD-ROM, a DVD-ROM or any other form of computer readable medium known in the art. An exemplary computer readable medium is coupled to the processor, where the processor can read information from, and write information to, the computer readable medium. In the alternative, the computer readable medium may be integral to the processor. The processor and the computer readable medium may reside in an ASIC. The ASIC may reside in a mobile unit, base station transceiver, or satellite transponder. In the alternative, the processor and the computer readable medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A method for selecting a best serving sector in a CDMA communication system, said method comprising steps of:

comparing a plurality of signal levels received from a plurality of active sectors with a signal level of a current serving sector to produce a difference;

generating a delta credit for each of said plurality of active sectors based on said difference;

accumulating a plurality of delta credits to produce an accumulated total credit;

identifying said best serving sector from said accumulated total credit.

2. The method of claim 1 wherein said plurality of signal levels received from said plurality of active sectors comprises a fixed rate signal level and a variable rate signal level.

3. The method of claim 2 further comprising a step of adjusting said fixed rate signal level to produce an adjusted fixed rate signal level prior to said comparing step.

4. The method of claim 3 further comprising a step of authorizing said plurality of delta credits prior to said identifying step.

5. The method of claim 4 further comprising steps of:

receiving a plurality of DRC lock bits;

adjusting said variable rate signal to produce an adjusted variable rate signal level.

6. The method of claim 5 further comprising steps of:

determining a sector having a highest variable rate mode from said plurality of active sectors;

determining a sector having a highest fixed rate mode from said plurality of active sectors.

7. The method of claim 6 further comprising a step of determining a preferred mode.

8. An apparatus for selecting a best serving sector in a CDMA communication system, said apparatus comprising:

means for comparing a plurality of signal levels received from a plurality of active sectors with a signal level of a current serving sector to produce a difference;

means for generating a delta credit for each of said plurality of active sectors based on said difference;

means for accumulating a plurality of delta credits to produce an accumulated total credit;

means for identifying said best serving sector from said accumulated total credit.

9. The apparatus of claim 8 wherein said plurality of signal levels received from said plurality of active sectors comprises a fixed rate signal level and a variable rate signal level.

10. The apparatus of claim 9 further comprising a means for of adjusting said fixed rate signal level to produce an adjusted fixed rate signal level.

11. The apparatus of claim 10 further comprising a means for authorizing said plurality of delta credits.

12. The apparatus of claim 11 further comprising:

means for receiving a plurality of DRC lock bits;

means for adjusting said variable rate signal to produce an adjusted variable rate signal level.

13. The apparatus of claim 12 further comprising:

means for determining a sector having a highest variable rate mode from said plurality of active sectors;

means for determining a sector having a highest fixed rate mode from said plurality of active sectors.

14. The apparatus of claim 13 further comprising a means for determining a preferred mode.

15. A method for selecting a best serving sector in a CDMA communication system, said method comprising steps of:

comparing a plurality of signal levels received from a plurality of active sectors with a signal level of a current serving sector to produce a difference, said plurality of signal levels comprising a fixed rate signal level and a variable rate signal level;

generating a delta credit for each of said plurality of active sectors based on said difference;

accumulating a plurality of said delta credits to produce an accumulated total credit;

authorizing said accumulated total credit to produce a final credit total;

identifying said best serving sector from said final credit total.

16. The method of claim 15 further comprising a step of adjusting said fixed rate signal level to produce an adjusted fixed rate signal level prior to said comparing step.

17. The method of claim 16 further comprising steps of:

receiving a plurality of DRC lock bits;

adjusting said variable rate signal to produce an adjusted variable rate signal level.

18. The method of claim 17 further comprising steps of:

determining a sector having a highest variable rate mode from said plurality of active sectors;

determining a sector having a highest fixed rate mode from said plurality of active sectors.

19. The method of claim 16 further comprising a step of determining a preferred mode.

20. A method for selecting a best serving sector in a CDMA communication system, said method comprising steps of:

determining a plurality of signal levels received from a plurality of active sectors, said plurality of signal levels comprising a fixed rate signal level and a variable rate signal level;

adjusting said fixed rate signal level to produce an adjusted fixed rate signal level;

comparing said plurality of signal levels received from said plurality of active sectors with a signal level of a current serving sector to produce a difference;

generating a delta credit for each of said plurality of active sectors based on said difference;

accumulating a plurality of said delta credits to produce an accumulated total credit;

receiving a plurality of DRC lock bits for said plurality of active sectors;

authorizing said accumulated total credit to produce a final credit total based on said plurality of DRC lock bits;

identifying said best serving sector from said final credit total.

21. The method of claim 20 further comprising steps of:

determining a sector having a highest variable rate mode from said plurality of active sectors;

determining a sector having a highest fixed rate mode from said plurality of active sectors.

22. The method of claim 21 further comprising a step of determining a preferred mode.

23. A computer readable medium including a computer program, said computer program for implementing a method for selecting a best serving sector in a CDMA communication system, said computer program comprising:

a first code segment for comparing a plurality of signal levels received from a plurality of active sectors with a signal level of a current serving sector to produce a difference;

a second code segment for generating a delta credit for each of said plurality of active sectors based on said difference;

a third code segment for accumulating a plurality of delta credits to produce an accumulated total credit;

a fourth code segment for identifying said best serving sector from said accumulated total credit.

24. The computer readable medium of claim 23 wherein said plurality of signal levels received from said plurality of active sectors comprises a fixed rate signal level and a variable rate signal level.

25. The computer readable medium of claim 24 further comprising a fifth code segment for adjusting said fixed rate signal level to produce an adjusted fixed rate signal level prior to said comparing said plurality of signal levels received from said plurality of active sectors with said signal level of said current serving sector to produce said difference.

26. The computer readable medium of claim 25 further comprising a sixth code segment for authorizing said plurality of delta credits prior to said identifying said best serving sector from said accumulated total credit.

* * * * *

UNITED STATES PATENT AND TRADEMARK OFFICE
CERTIFICATE OF CORRECTION

PATENT NO. : 6,680,925 B1
DATED : January 20, 2004
INVENTOR(S) : Wu et al.

Figure 7:
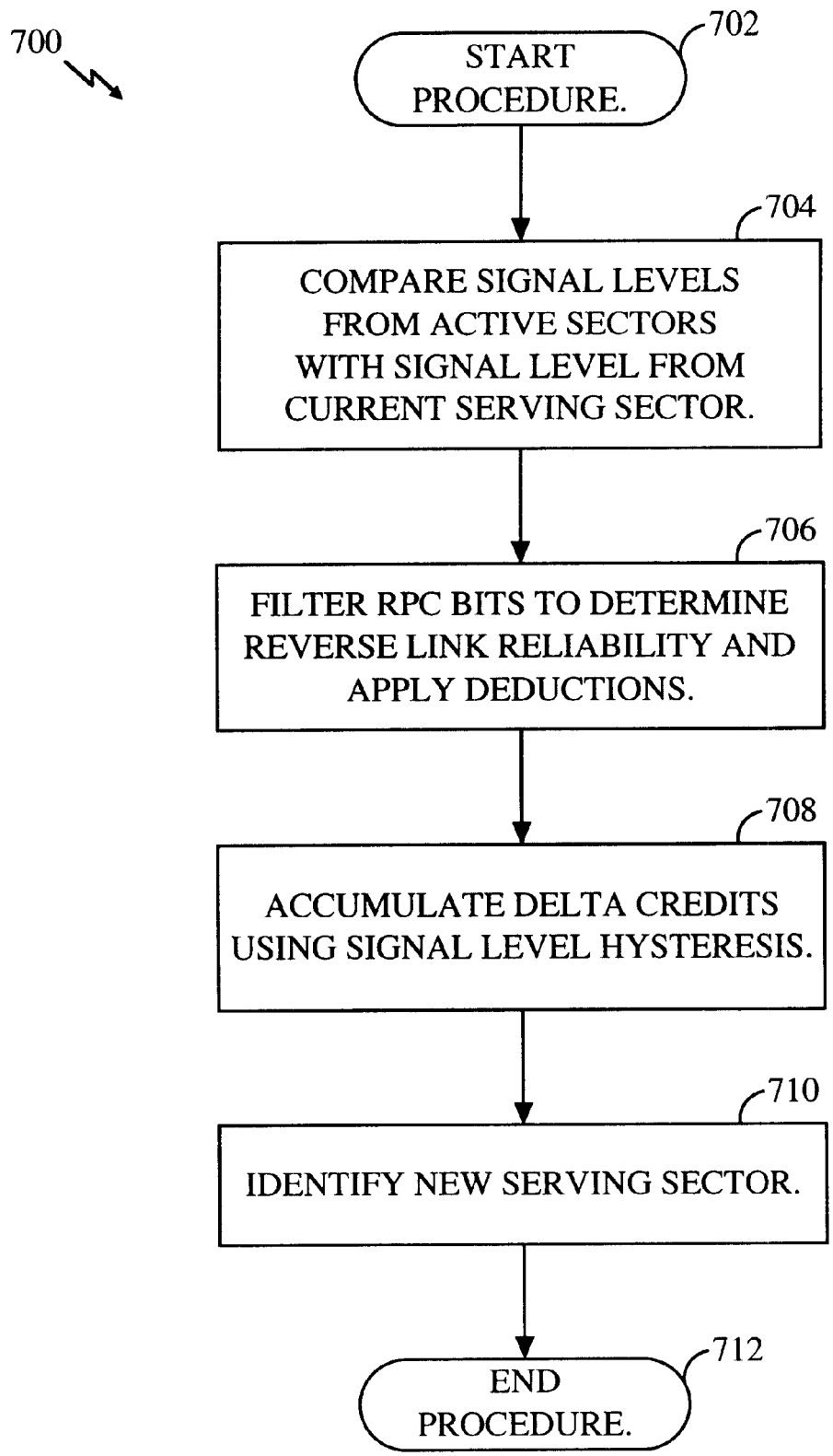
FIG. 7 illustrates an exemplary procedure for selecting a best serving sector using RPC bits.

It is certified that error appears in the above-identified patent and that said Letters Patent is hereby corrected as shown below:

Drawings,
FIG. 3, text box 312, change "DIFFVR" to -- DIFFVF --.
FIG. 7, text box 710, after "NEW" insert -- BEST --.

Column 10,
Line 37, change "and DeltaCreditVV" to -- and DeltaCreditFF --.

Column 12,
Lines 18 and 45, after "signal" insert -- level --.
Line 44, after "for" delete "of.".

Column 13,
Line 15, after "signal" insert -- level --.

Signed and Sealed this

Fourteenth Day of March, 2006

JON W. DUDAS
*Director of the United States Patent and Trademark Office*